(12) United States Patent
Huang et al.

(10) Patent No.: US 9,541,379 B2
(45) Date of Patent: Jan. 10, 2017

(54) DISPLACEMENT DETECTION DEVICE AND POWER SAVING METHOD THEREOF

(71) Applicant: PixArt Imaging Inc, Hsin-chu County (TW)

(72) Inventors: Yu-Hao Huang, Hsin-chu (TW); Ming-Tsan Kao, Hsin-chu (TW); Sen-Huang Huang, Hsin-chu (TW)

(73) Assignee: PIXART IMAGING INC, Hsin-Chu County (TW)

( * ) Notice: Subject to any disclaimer, the term of this patent is extended or adjusted under 35 U.S.C. 154(b) by 355 days.

(21) Appl. No.: 13/916,631

(22) Filed: Jun. 13, 2013

(65) Prior Publication Data

US 2014/0028868 A1 Jan. 30, 2014

(30) Foreign Application Priority Data

Jul. 27, 2012 (TW) .............................. 101127124 A

(51) Int. Cl.
| | |
|---|---|
| G06F 3/033 | (2013.01) |
| G01B 11/14 | (2006.01) |
| G06F 3/03 | (2006.01) |
| G01B 11/02 | (2006.01) |

(52) U.S. Cl.
CPC .............. *G01B 11/14* (2013.01); *G01B 11/02* (2013.01); *G06F 3/0317* (2013.01)

(58) Field of Classification Search
CPC .... G06F 3/0317; G06F 3/0321; G06F 1/3256; G06F 1/3259; G01B 11/02; G01B 11/14

USPC ......................................... 345/166; 348/222.1
See application file for complete search history.

(56) References Cited

U.S. PATENT DOCUMENTS

| | | | |
|---|---|---|---|
| 7,016,519 B1* | 3/2006 | Nakamura et al. ........... 382/106 |
| 2002/0101532 A1* | 8/2002 | Takayama ............ H04N 5/2351 348/362 |
| 2005/0068300 A1* | 3/2005 | Wang et al. .................. 345/166 |
| 2005/0168444 A1 | 8/2005 | Lin et al. |
| 2009/0195505 A1* | 8/2009 | Chen et al. ................... 345/166 |
| 2012/0201526 A1* | 8/2012 | Tanaka ...................... F16F 7/00 396/55 |
| 2012/0257004 A1* | 10/2012 | Smith .................... H04N 7/144 348/14.16 |
| 2013/0315477 A1* | 11/2013 | Murray ............ G06F 17/30247 382/159 |

FOREIGN PATENT DOCUMENTS

| | | |
|---|---|---|
| CN | 101566889 A | 10/2009 |
| TW | 200527176 A | 8/2005 |
| TW | 200912700 A | 3/2009 |

* cited by examiner

*Primary Examiner* — Jimmy H Nguyen
(74) *Attorney, Agent, or Firm* — Hauptman Ham, LLP

(57) ABSTRACT

A displacement detection device includes an image sensor, a light source and a processing unit. The image sensor is configured to successively capture images. The light source provides light with an emission frequency and an emission duration for the image sensor in capturing the images. The processing unit is configured to calculate a displacement according to the images and to adjust both the emission frequency and the emission duration according to the displacement.

20 Claims, 4 Drawing Sheets

DISPLACEMENT DETECTION DEVICE AND POWER SAVING METHOD THEREOF

CROSS REFERENCE TO RELATED APPLICATION

This application claims the priority benefit of Taiwan Patent Application Serial Number 101127124, filed on Jul. 27, 2012, the full disclosure of which is incorporated herein by reference.

BACKGROUND

1. Field of the Disclosure

This disclosure generally relates to a human machine interface device and, more particularly, to a displacement detection device and a power saving method thereof that may keep the average current consumption of the light source low and may maintain the image brightness as well.

2. Description of the Related Art

Traditionally, the optical mouse is served as one of the peripheral devices configured to interact with a computer system having a display screen. An optical mouse generally has a light source, an image sensor and a processing unit. The light source projects light to a work surface. The image sensor receives reflected light from the work surface and successively outputs image frames. The processing unit calculates a displacement of the optical mouse with respect to the work surface according to the image frames to accordingly control the computer system.

In order to improve the operational convenience of an optical mouse, the optical mouse can transfer the displacement information to the computer system via wireless transmission. Therefore, how to save the average consumption power of the optical mouse and to extend the service time of the battery becomes an important issue.

Referring to FIG. 1, it shows a schematic diagram of the image capturing and the emission of the light source in the conventional optical mouse. The image sensor successively captures image frames at a sampling frequency. When the optical mouse is moved at high speed, the light source is lighted at a high emission frequency whereas when the optical mouse is moved at low speed, the light source is lighted at a lower emission frequency so as to reduce the consumption current of the light source. However, in this power saving method the consumption current of the light source at high speed is still about twice of that at low speed.

Accordingly, the present disclosure further provides a displacement detection device and a power saving method thereof that may reduce the consumption current of the light source by changing both the emission frequency and the emission duration thereby reducing the total power consumption.

SUMMARY

The present disclosure provides a displacement detection device and a power saving method thereof that may dynamically adjust both the emission frequency and the emission duration of the light source to keep the consumption current of the light source low thereby reducing the total power consumption.

The present disclosure further provides a displacement detection device and a power saving method thereof that may dynamically adjust the emission frequency and the emission duration of the light source and the image gain of the image sensor to allow the light source to consume substantially identical current and the image sensor to output images with substantially identical brightness.

The present disclosure provides a displacement detection device including an image sensor, a light source and a processing unit. The image sensor is configured to successively capture images. The light source is configured to provide light with at least one emission frequency and at least one emission duration for the image sensor in capturing the images. The processing unit is configured to calculate a displacement according to the images and to adjust both the emission frequency and the emission duration according to the displacement.

The present disclosure further provides a displacement detection device including an image sensor, a light source and a processing unit. The image sensor is configured to successively capture and output images with at least one image gain. The light source is configured to provide light with at least one emission frequency and at least one emission duration for the image sensor in capturing the images. The processing unit is configured to calculate a displacement according to the images and to adjust all the emission frequency, the emission duration and the image gain, or to adjust both the emission frequency and the emission duration.

The present disclosure further provides a power saving method of a displacement detection device including the steps of: successively capturing images with an image sensor; calculating a displacement according to the images with a processing unit; and adjusting, using the processing unit, an emission frequency and an emission duration of a light source according to a comparison result of comparing the displacement with at least one threshold.

In the displacement detection device and the power saving method of the present disclosure, preferably an increasing scale of the emission frequency is positively correlated to a shortening scale of the emission duration. Preferably an increasing scale of the emission frequency is positively correlated to an amplifying scale of the image gain. For example, the amplifying scale may be equal to, a little bit smaller than or a little bit larger than the increasing scale.

In the displacement detection device and the power saving method of the present disclosure, the emission frequency and the image gain are increased and the emission duration is shortened when the displacement is larger than a first threshold; and the emission frequency and the image gain are decreased and the emission duration is extended when the displacement is lower than a second threshold.

In the displacement detection device and the power saving method of the present disclosure, the emission frequency is increased and the emission duration is shortened when the displacement is larger than a first threshold; and the emission frequency is decreased and the emission duration is extended when the displacement is lower than a second threshold.

In the displacement detection device and the power saving method of the present disclosure, the processing unit keeps the average current consumption of the light source at a substantially fixed low value by adjusting both the emission frequency and the emission duration thereby effectively reducing the total power consumption. The processing unit further adjusts the image gain to keep the image brightness substantially fixed thereby increasing the calculation stability.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

Figure 1:
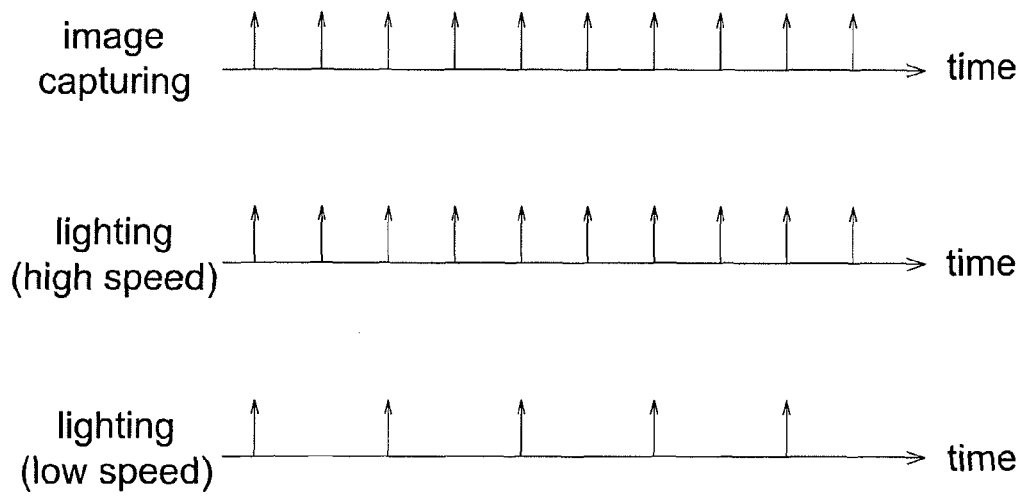
FIG. 1 shows a schematic diagram of the image capturing and the emission of the light source of the conventional optical mouse.
Figure 2A:
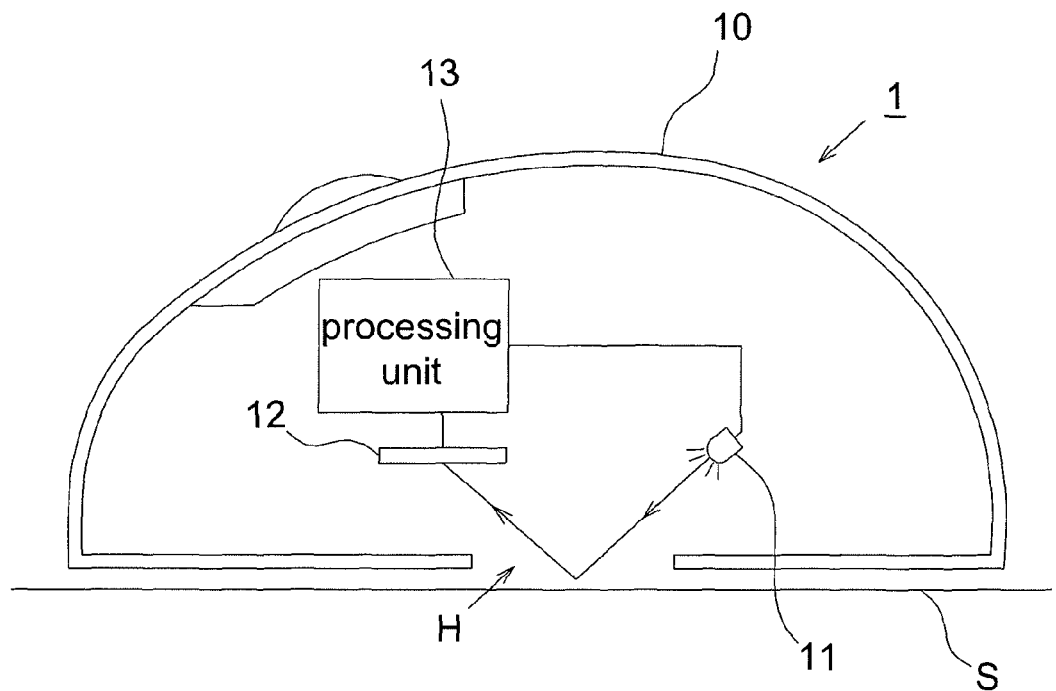
FIG. 2A shows a schematic diagram of the displacement detection device according to an embodiment of the present disclosure.
Figure 2B:
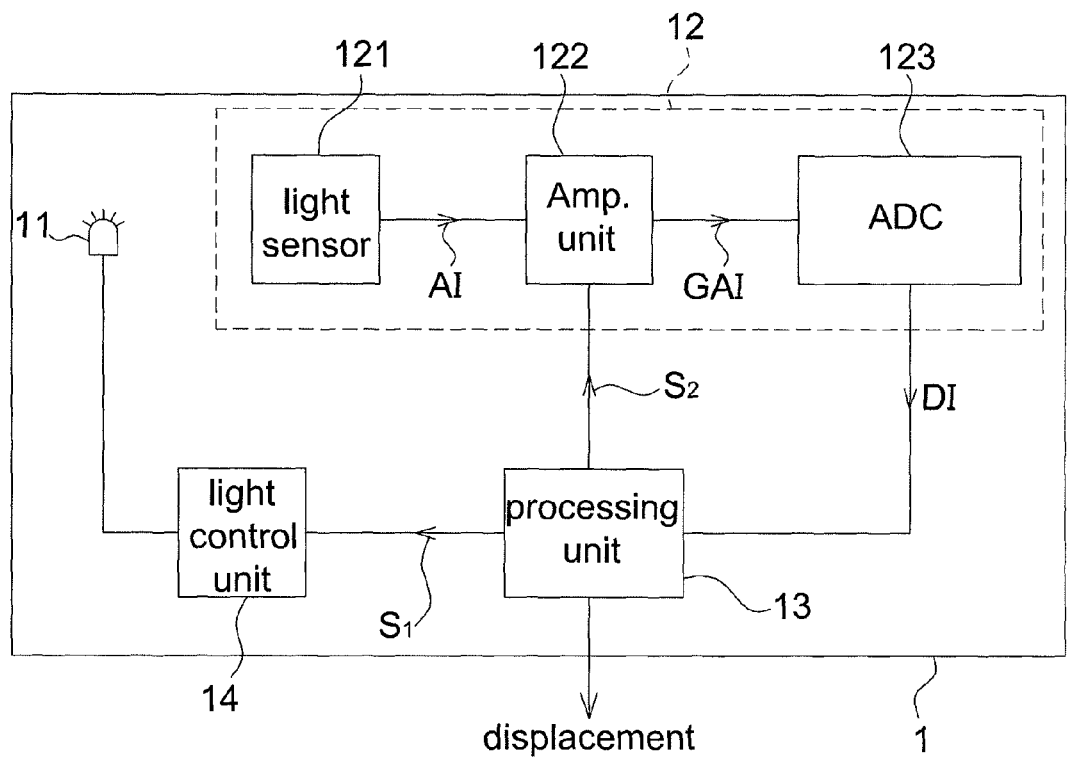
FIG. 2B shows a schematic block diagram of the displacement detection device according to an embodiment of the present disclosure.

Referring to FIGS. 2A and 2B, FIG. 2A shows a schematic diagram of the displacement detection device according to an embodiment of the present disclosure; and FIG. 2B shows a schematic block diagram of the displacement detection device according to an embodiment of the present disclosure.

The displacement detection device 1 has a housing 10 configured to be put on a work surface S and operated by a user. For example, the displacement detection device 1 may be an optical mouse or other displacement detection devices for detecting its relative motion with respect to the work surface S.

The displacement detection device 1 includes a light source 11, an image sensor 12, a processing unit 13 and a light control unit 14, wherein the light control unit 14 may be integrated in or independent from the processing unit 13. In other words, when the light control unit 14 is included inside the processing unit 13, the processing unit 13 may directly control the light source 11, whereas when the light control unit 14 is not included in the processing unit 13, the processing unit 13 may control the light source 11 through the light control unit 14. In the present disclosure, for simplification, descriptions of controlling the light source 11 by the processing unit 13 include the two cases mentioned above. In this embodiment, the displacement detection device 1 may detect a displacement and other parameters with respect to the work surface S, and may adjust the operation parameter of the light source 11 and the image sensor 12 according to the detected displacement; e.g. adjusting the operation parameter according to a comparison result of comparing the displacement with at least one displacement threshold (described later).

The light source 11 may be at least one light emitting diode, at least one laser diode or other active light sources, and preferably may emit red light, infrared light or other invisible light to illuminate the work surface S through an opening H at a bottom surface of the housing 10. The light source 11 provides light needed by the image sensor 12 in capturing images with at least one emission frequency and at least one emission duration, wherein said emission duration is referred to a time interval each time the light source 11 is turned on.

The image sensor 12 may be a CCD image sensor, a CMOS image sensor or other sensors for sensing optical energy. The image sensor 12 receives reflected light from the work surface S through the opening H to successively capture and output images. In one embodiment, referring to FIG. 2B, the image sensor 12 may further include a light sensing unit 121, an amplification unit 122 and an analog-to-digital converter (ADC) 123. The light sensing unit 121 may be a sensing matrix, and is configured to receive the reflected light from the work surface S and output an analog image AI. The amplification unit 122 amplifies the analog image AI with an image gain G and output an amplified analog image GAI; that is, the image gain G is an analog gain herein. The analog-to-digital converter 123 is configured to digitize the amplified analog image GAI and output a digital image DI. In other words, the image sensor 12 may use an image gain G as an internal parameter to successively capture and output images, and when the image gain G is higher, the average image brightness of the outputted images becomes higher.

The processing unit 13 may be a digital signal processor (DSP) and is configured to post-process the image (more specifically the digital image DI) outputted by the image sensor 12, e.g. calculating a displacement according to the images and adjusting both the emission frequency and the emission duration according to the displacement; e.g. sending a light control signal $S_1$ to control the emission frequency and the emission duration of the light source 11; e.g. adjusting both the emission frequency and the emission duration and/or the image gain according to the displacement; e.g. further sending a gain control signal $S_2$, in addition to the light control signal $S_1$, to control the image gain of the image sensor 12. In one embodiment, the processing unit 13 may adjust the emission frequency, the emission duration and the image gain according to a comparison result of comparing the displacement with at least one displacement threshold, and may continuously calculate and output displacement according to the updated operation parameters. It should be mentioned that although the image sensor 12 may continuously capture images when the light source 11 is not turned on, the images captured within the time the light source 11 being turned off may be treated as invalid images which will not be used to calculate the displacement; i.e. in this embodiment the processing unit 13 calculates displacement only according to valid images captured within the time the light source 11 being turned on.

In the present disclosure, as the consumption current of the light source 11 is larger than that of the amplification unit 122, it is still able to effectively reduce the total power consumption of the displacement detection device 1 by shortening the emission duration of the light source 11 and increasing the image gain of the image sensor 12. Preferably, the processing unit 13 may adjust both the emission frequency and the emission duration so as to keep an average current consumption of the light source 11 unchanged. In this embodiment, the method of the processing unit 13 calculating the displacement is well known, for example, but not limited to, calculating the displacement according to the correlation between images, and thus details thereof are not described herein.

Figure 3:
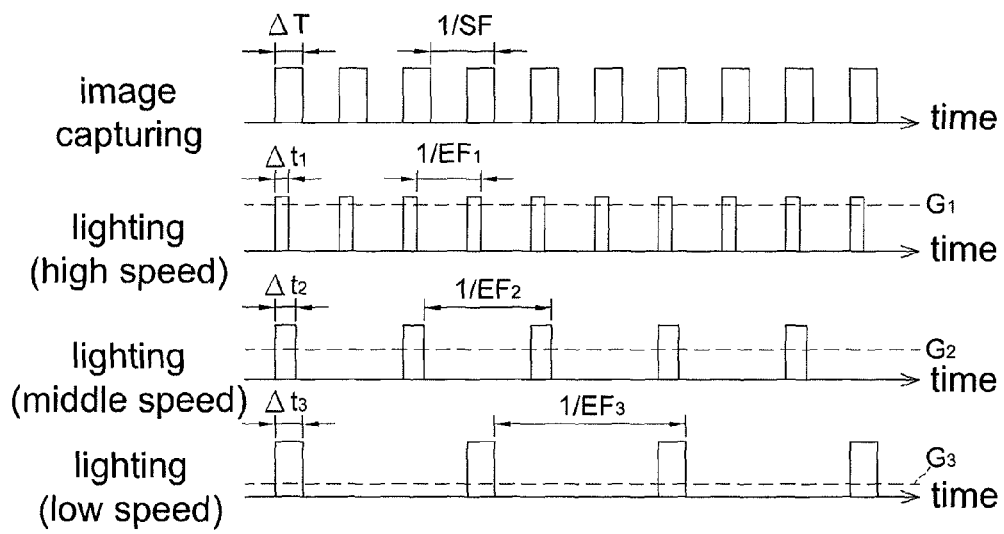
FIG. 3 shows an operational schematic diagram of the power saving method of the displacement detection device according to the embodiment of the present disclosure.

Referring to FIG. 3, it shows an operational schematic diagram of the power saving method of the displacement detection device according to the embodiment of the present disclosure. In this embodiment, the image sensor 12 successively captures images with a fixed sampling frequency SF and a sampling duration $\Delta T$. The light source 11 may operate in a high speed mode having a first emission frequency $EF_1$ and a first emission duration $\Delta t_1$, in a middle speed mode having a second emission frequency $EF_2$ and a second emission duration $\Delta t_2$, or in a low speed mode having a third emission frequency $EF_3$ and a third emission duration $\Delta t_3$; in this embodiment, $EF_1 > EF_2 > EF_3$ and $\Delta t_3 > \Delta t_2 > \Delta t_1$. In one embodiment, the first emission frequency $EF_1$ may be twice of the second emission frequency $EF_2$ and the first emission frequency $EF_1$ may be three times of the third emission frequency $EF_3$; and the first emission duration $\Delta t_1$ may be ½ of the second emission duration $\Delta t_2$ and the first emission duration $\Delta t_1$ may be ⅓ of the third emission duration $\Delta t_3$. In the present disclosure, when the displacement increases, the emission frequency EF of the light source 11 is increased and the emission duration $\Delta t$ of the light source 11 is shortened. Preferably the light source 11 may have substantially identical average current consumption in different speed modes.

In this embodiment, preferably an increasing scale of the emission frequency EF of the light source 11 is positively correlated to a shortening scale of the emission duration $\Delta t$ of the light source 11. For example in one embodiment, when the emission frequency EF of the light source 11 is increased by N times (i.e. N×EF), the emission duration $\Delta t$ is shortened by N×r times (i.e. $\Delta t/N \times r$), wherein N is a positive integer and r is a ratio value which may be a little bit larger than, equal to or a little bit smaller than 1, e.g. r=0.8-1.2. In high speed operation, the track outputted by the displacement detection device 1 can tolerate more noise and thus in the present embodiment the displacement detection may be performed by using images having a lower contrast, lower brightness or lower signal to noise ratio (SNR) in high speed operation.

In another embodiment, in high speed operation it is able to increase the image brightness by increasing the image gain of the image sensor 12; i.e. in addition to adjusting the operation parameter such as the emission frequency EF and the emission duration $\Delta t$ of the light source 11 mentioned above, the image sensor 12 may output images with a first image gain $G_1$ in the high speed mode, output images with a second image gain $G_2$ in the middle speed mode, and output images with a third image gain $G_3$ in the low speed mode; in this embodiment, $G_1 > G_2 > G_3$. For example in one embodiment, the first image gain $G_1$ may be twice of the second image gain $G_2$ and the first image gain $G_1$ may be three times of the third image gain $G_3$. In other words, in this embodiment when the displacement increases, the emission frequency EF of the light source 11 and the image gain G of the image sensor 12 are increased and the emission duration $\Delta t$ of the light source 11 is shortened; and when the displacement decreases, the emission frequency EF of the light source 11 and the image gain G of the image sensor 12 are decreased and the emission duration $\Delta t$ of the light source 11 is extended such that the light source 11 may have a substantially identical average current consumption and the image sensor 12 may output images having substantially identical brightness in different speed modes.

Similarly, preferably an increasing scale of the emission frequency EF of the light source 11 is positively correlated to a shortening scale of the emission duration $\Delta t$ of the light source 11. In addition, preferably an increasing scale of the emission frequency EF is positively correlated to an amplifying scale of the image gain G. For example the amplifying scale may be equal to, a little bit smaller than or a little bit larger than 1, e.g. r=0.8-1.2. However, as noise can be increased when the image gain is increased, in order not to allow the calculation result to be influenced by large noise, the processing unit 13 may further calculate a random noise and a maximum value of the amplifying scale of the image gain G may be limited by the random noise, e.g. limiting the random noise less than 4 gray levels. It is appreciated that values and scales used in the above embodiments are only exemplary but not to limit the present disclosure.

Figure 4A:
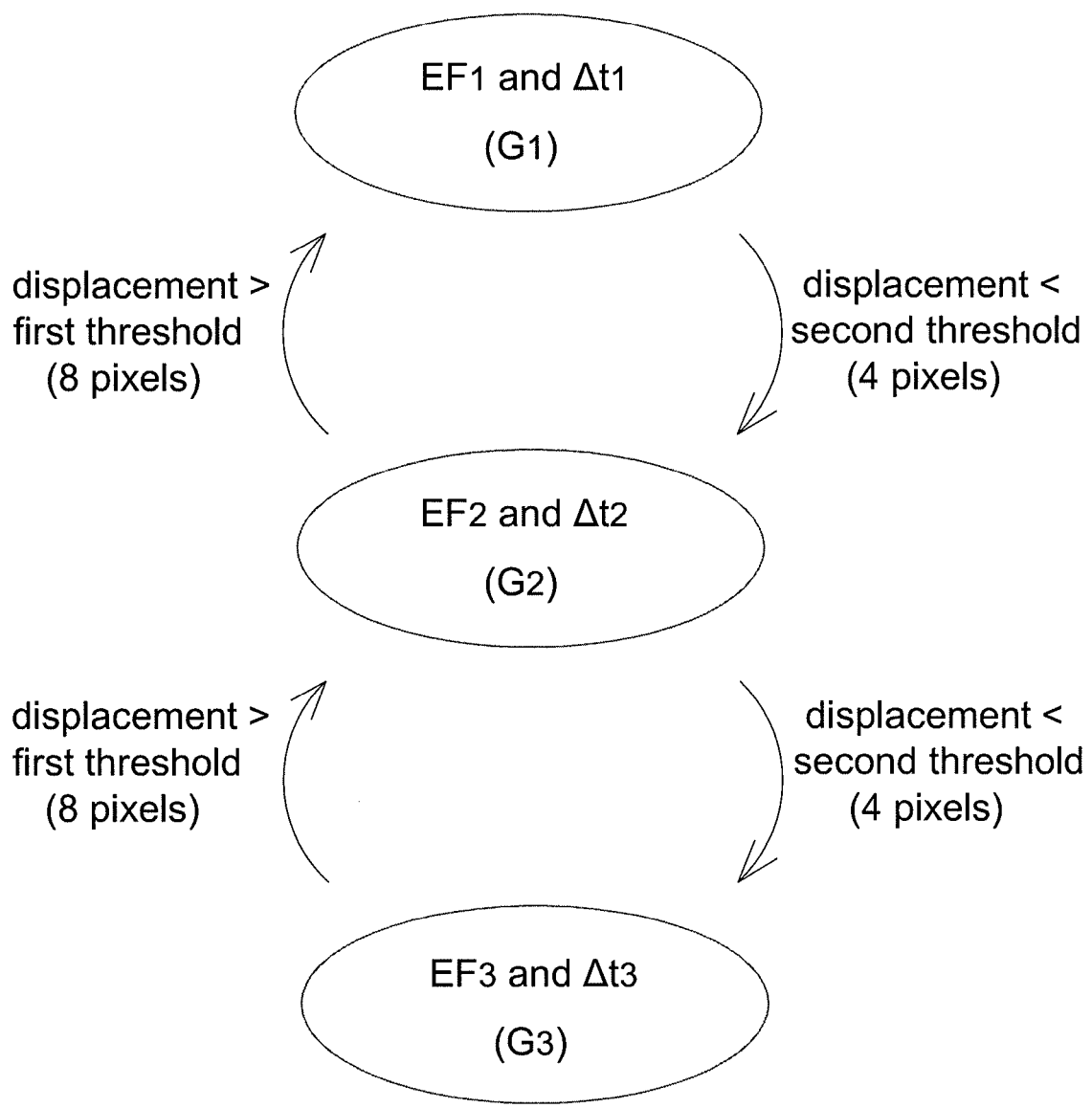
FIG. 4A shows a schematic diagram of comparing the displacement and thresholds in the power saving method of the displacement detection device according to the embodiment of the present disclosure.

Referring to FIG. 4A, it shows a schematic diagram of adjusting the operation parameter according to the displacement in the power saving method of the displacement detection device according to the embodiment of the present disclosure, wherein said operation parameter may only include the emission frequency and the emission duration, or include all the emission frequency, the emission duration and the image gain. In this embodiment, the processing unit 13 changes a speed mode according to a comparison result of comparing the displacement with a first threshold and a second threshold, wherein each speed mode is associated with an emission frequency, an emission duration and an image gain. As mentioned above the image gain may not be included in the operation parameter. The first threshold may or may not be equal to the second threshold, wherein different thresholds are to prevent the speed mode from being frequently changed when the displacement is close to the threshold. In this embodiment, when the displacement is larger than a first threshold, the emission frequency EF and the image gain G are increased and the emission duration $\Delta t$ is shortened; when the displacement is lower than a second threshold, the emission frequency EF and the image gain G are decreased and the emission duration $\Delta t$ is extended; and the first threshold is larger than the second threshold herein. If the image gain G is not adjusted, the emission frequency EF is increased and the emission duration $\Delta t$ is shortened when the displacement is larger than the first threshold; and the emission frequency EF is decreased and the emission duration $\Delta t$ is extended when the displacement is lower than the second threshold.

For example in FIG. 4A, a high speed mode is associated with a first emission frequency and a first emission duration (furthermore, a first image gain). When the processing unit 13 identifies that a displacement is smaller than a second threshold (for example, but not limited to, 4-pixel distance), a middle speed mode is entered. The middle speed mode is associated with a second emission frequency and a second emission duration (furthermore, a second image gain). When the processing unit 13 identifies that the displacement is smaller than the second threshold, a low speed mode is entered; and when the processing unit 13 identifies that the displacement is larger than a first threshold (for example, but not limited to, 8-pixel distance), return to the high speed mode again. The low speed mode is associated with a third emission frequency and a third emission duration (furthermore, a third image gain). The low speed mode is maintained when the processing unit 13 identifies that the displacement is smaller than the first threshold; and when the processing unit 13 identifies that the displacement is larger than the first threshold, the middle speed mode is entered.

Figure 4B:
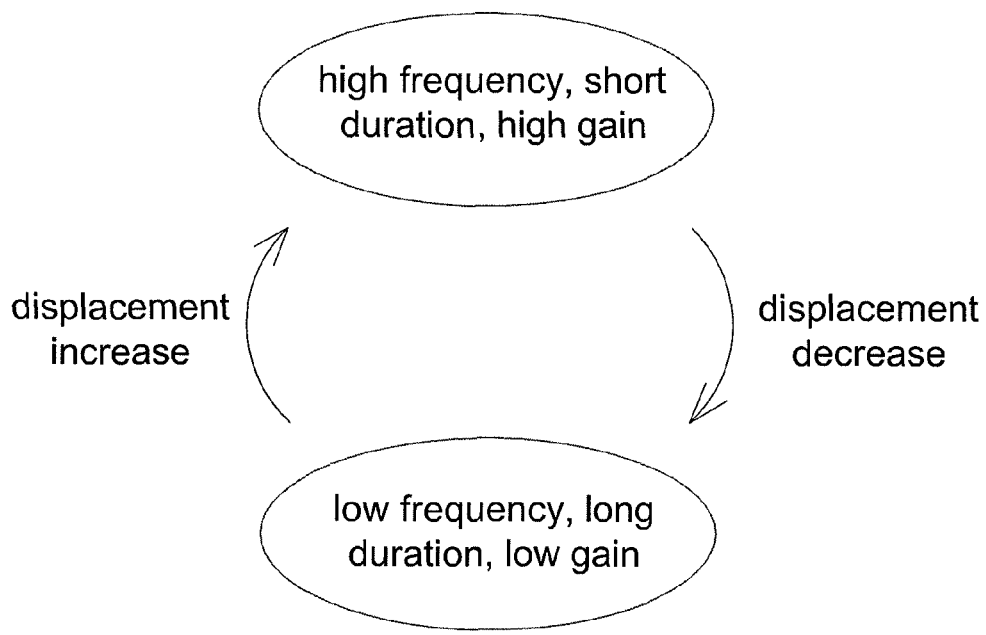
FIG. 4B shows another operational schematic diagram of the power saving method of the displacement detection device according to the embodiment of the present disclosure.

It is appreciated that adjustable values of the emission frequency, the emission duration and the image gain are not limited to three. For example referring to FIG. 4B, it shows another operational schematic diagram of the power saving method of the displacement detection device according to the embodiment of the present disclosure, wherein when the displacement increases, the emission frequency is increased, the emission duration is shortened and the image gain is increased; and when the displacement decreases, the emission frequency is decreased, the emission duration is extended and the image gain is decreased. As mentioned above, the image gain may not be adjusted simultaneously and only the emission frequency and the emission duration are adjusted. Adjustable steps of the emission frequency, the emission duration and the image gain may be determined according to the resolution required.

Figure 5:
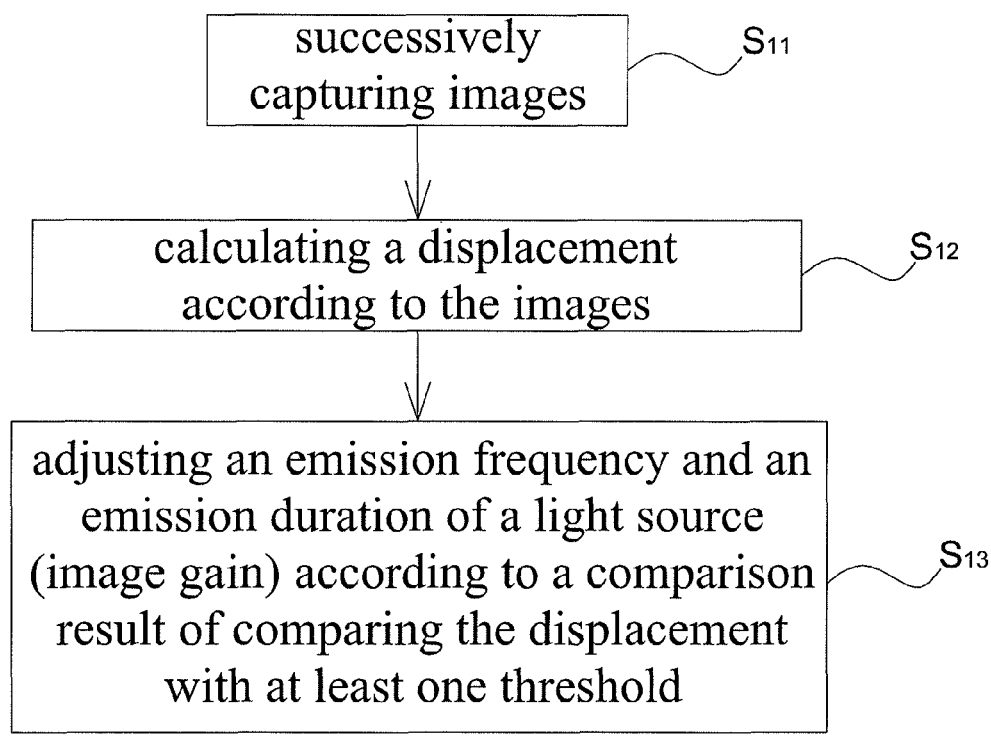
FIG. 5 shows a flow chart of the power saving method of the displacement detection device according to the embodiment of the present disclosure.

Referring to FIG. 5, it shows a flow chart of the power saving method of the displacement detection device according to the embodiment of the present disclosure, which includes the steps of: successively capturing images with an image sensor (Step $S_{11}$); calculating a displacement according to the images with a processing unit (Step $S_{12}$); and adjusting, using the processing unit, an emission frequency and an emission duration of a light source according to a comparison result of comparing the displacement with at least one threshold (Step $S_{13}$). In another embodiment, in the Step $S_{13}$ the processing unit may further adjust an image gain of the image sensor according to the comparison result. In the present disclosure, the object of saving power consumption of the light source may be achieved by only adjusting the emission frequency and the emission duration. The image gain may further be adjusted to stable the image brightness thereby increasing the calculation accuracy. Details of the embodiment of FIG. 5 have be described in FIGS. 3, 4A, 4B and their corresponding descriptions and thus are not repeated herein.

In this embodiment, although the processing unit 13 determines the emission frequency, the emission duration and the image gain mainly according to the displacement, there are different implementations. For example in one embodiment, the processing unit 13 may adjust the image gain of the image sensor 12 corresponding to the adjustment of the emission duration or the emission frequency. For example when the emission frequency is adjusted by N times, the image gain may be adjusted by N×r times; and when the emission duration is shortened by N times, the image gain may be adjusted by N×r times; wherein r may be similar to the ratio value mentioned above. In another embodiment, the processing unit 13 may determine a speed mode at first according to the displacement, and after the speed mode is determined, the emission frequency, the emission duration and the image gain may be determined together. In other words, in the present disclosure the processing unit 13 may determine the speed mode at first according to the displacement, and then may determine the operation parameter according to the speed mode; or may determine the operation parameter directly according to the displacement without considering the speed mode. The adjustment of the image gain may be directly associated with the emission frequency or the emission duration without being directly associated with the displacement.

As mentioned above, as the conventional optical mouse only changes the emission frequency of the light source, a higher average current is still consumed by the light source at the high speed mode. Therefore, the present disclosure further provides a displacement detection device (FIGS. 2A and 2B) and a power saving method thereof (FIGS. 3-5) that may keep the average current consumption of the light source low so as to save the total power consumption and may keep the image brightness stable by adjusting the image gain.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. A displacement detection device, comprising:
an image sensor configured to successively capture images at a fixed sampling frequency;
a light source configured to provide light with an emission frequency and an emission duration for the image sensor in capturing the images, wherein the emission duration is a time interval that the light source is turned on each time; and
a processing unit configured to
calculate, according to a correlation between the images captured by the image sensor, a displacement of the displacement detection device with respect to a work surface, and
adjust both of the emission frequency and the emission duration according to a comparison between the displacement and at least one threshold,
wherein when the emission frequency is increased, the emission duration is shortened and
wherein when the emission frequency is decreased, the emission duration is extended.

2. The displacement detection device as claimed in claim 1, wherein when the displacement exceeds the at least one threshold, the emission frequency is increased and the emission duration is shortened.

3. The displacement detection device as claimed in claim 2, wherein an increasing scale of the emission frequency is positively correlated to a shortening scale of the emission duration.

4. The displacement detection device as claimed in claim 3, wherein when the emission frequency is increased by N times, the emission duration is divided by N×r, and r=0.8 to 1.2 and N is a positive integer.

5. The displacement detection device as claimed in claim 1, wherein
the emission frequency is adjusted to a first emission frequency, a second emission frequency or a third emission frequency; and
the first emission frequency is larger than the second emission frequency and the second emission frequency is larger than the third emission frequency.

6. The displacement detection device as claimed in claim 1, wherein
the emission duration is adjusted to a first emission duration, a second emission duration or a third emission duration; and
the first emission duration is smaller than the second emission duration and the second emission duration is smaller than the third emission duration.

7. A displacement detection device, comprising:
an image sensor configured to successively capture and output images with an image gain and a fixed sampling frequency;
a light source configured to provide light with an emission frequency and an emission duration for the image sensor in capturing the images, wherein the emission duration is a time interval that the light source is turned on each time; and
a processing unit configured to calculate, according to a correlation between the images captured by the image sensor, a displacement of the displacement detection device with respect to a work surface, and adjust all of the emission frequency, the emission duration and the image gain according to a comparison between the displacement and at least one threshold, wherein when the emission frequency is increased, the emission duration is shortened and wherein when the emission frequency is decreased, the emission duration is extended.

8. The displacement detection device as claimed in claim 7, wherein when the displacement exceeds the at least one threshold, the emission frequency and the image gain are increased and the emission duration is shortened.

9. The displacement detection device as claimed in claim 7, wherein an increasing scale of the emission frequency is positively correlated to a shortening scale of the emission duration.

10. The displacement detection device as claimed in claim 7, wherein an increasing scale of the emission frequency is positively correlated to an amplifying scale of the image gain.

11. The displacement detection device as claimed in claim 10, wherein the processing unit is further configured to calculate a random noise, and a maximum value of the amplifying scale is limited by the random noise.

12. The displacement detection device as claimed in claim 7, wherein the emission frequency is adjusted to a first emission frequency, a second emission frequency or a third emission frequency; and the first emission frequency is larger than the second emission frequency and the second emission frequency is larger than the third emission frequency.

13. The displacement detection device as claimed in claim 7, wherein the emission duration is adjusted to a first emission duration, a second emission duration or a third emission duration; and the first emission duration is smaller than the second emission duration and the second emission duration is smaller than the third emission duration.

14. The displacement detection device as claimed in claim 7, wherein the image gain is adjusted to a first image gain, a second image gain or a third image gain; and the first image gain is larger than the second image gain and the second image gain is larger than the third image gain.

15. A power saving method of a displacement detection device, comprising:

successively capturing images with an image sensor at a fixed sampling frequency;

calculating, by a processing unit and according to a correlation between the images captured by the image sensor at the fixed sampling frequency, a displacement of the displacement detection device with respect to a work surface; and adjusting both of an emission frequency and an emission duration of a light source according to a comparison result of comparing the displacement with at least one threshold, wherein the emission duration is a time interval that the light source is turned on each time, wherein when the emission frequency is increased, the emission duration is shortened, and wherein when the emission frequency is decreased, the emission duration is extended.

16. The power saving method as claimed in claim 15, further comprising:

adjusting an image gain of the image sensor according to the comparison result.

17. The power saving method as claimed in claim 16, further comprising:

increasing the emission frequency and the image gain and shortening the emission duration when the displacement is larger than a first threshold; and decreasing the emission frequency and the image gain and extending the emission duration when the displacement is lower than a second threshold.

18. The power saving method as claimed in claim 15, further comprising:

increasing the emission frequency and shortening the emission duration when the displacement is larger than a first threshold; and decreasing the emission frequency and extending the emission duration when the displacement is lower than a second threshold.

19. The power saving method as claimed in claim 17, wherein the first threshold is equal to or different from the second threshold.

20. The power saving method as claimed in claim 15, further comprising:

adjusting an image gain of the image sensor corresponding to the adjusting of the emission frequency or the emission duration.

* * * * *